March 24, 1936.

B. J. ANDERSON 2,034,934

HANDLE BAR SHIELD

Filed Feb. 1, 1935

BERT J. ANDERSON
INVENTOR
BY Leon T. Hooper
ATTORNEY

Patented Mar. 24, 1936

2,034,934

UNITED STATES PATENT OFFICE 2,034,934

HANDLE BAR SHIELD

Bert J. Anderson, Hammond, Ind.

Application February 1, 1935, Serial No. 4,443

12 Claims. (Cl. 208—115)

This invention relates to a handle bar shield and has for its principal object the construction of an article which may be applied to the conventional rod or tubular handle bar and when so applied, improves the appearance of the entire velocipede.

An additional object of importance resides in the fact that the device may be economically manufactured and applied to handle bars and that when so applied, it produces a sturdy and rugged member and also covers welded joints. Grinding or other operations to remove the rough flashing from the welded joint are eliminated.

Another and still further important object of the shield of this invention resides in the means for attaching the device to a handle bar.

A still further important object of this invention is the fact that the edges of the shield are crimped around portions of both the front and rear surfaces of the handle bar.

Still another and further important object of this shield is the fact that it may be attached without alteration, to practically all the present types of velocipede handle bars.

A further object of importance and advantage is the fact that space is provided for positioning electric lights and dry cells within the body of the shield.

The invention possesses other objects and features of importance and advantage, some of which, with the foregoing, will be set forth in the following description.

The invention, in a preferred form, is illustrated in the annexed drawing and hereinafter more fully described.

Figure 1:
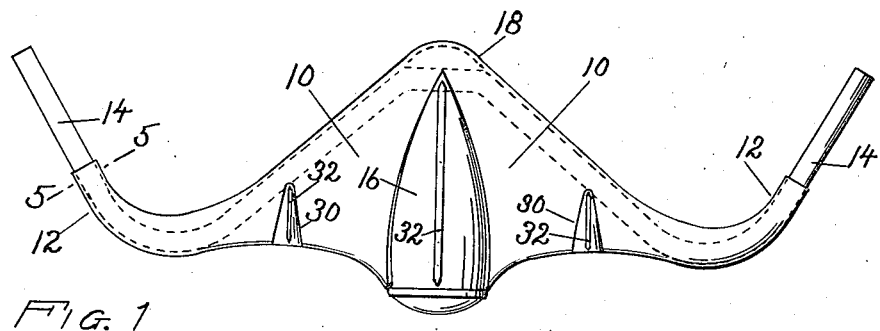
Figure 1 is a top plan view of the handle bar shield of this invention and is shown positioned on a conventional form of rod handle bar.
Figure 2:
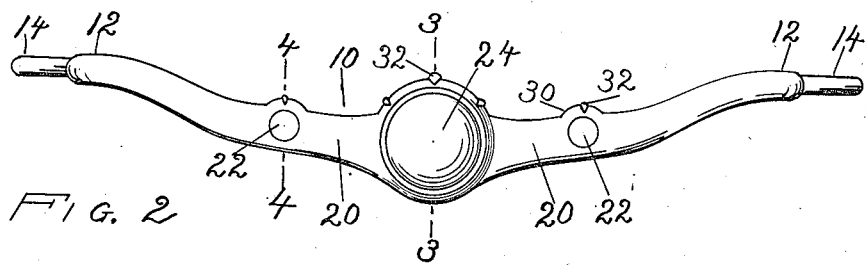
Figure 2 is a front elevation thereof.

The reference numeral 10 indicates in a general way the shield of this invention which, in the preferred embodiment, is constructed of a single piece of sheet metal, although it will be apparent that any other suitable material may be used. It will also be apparent that the shield may be positioned on rod or tubular handle bars of various shapes.

The shield is formed with a wide central portion, as is clearly shown in the drawing, and two outwardly disposed cylindrical ends 12, 12 which are adapted to be crimped tightly over the handle bar 14, forward of the grip portion.

Formed in the central portion of the body 10 is a raised semi-cylindrical portion 16, which provides a space suitable for a dry cell to be positioned within the body and also adds to the strength and appearance of the member.

The rear edge 18 of the body 10 is curled downwardly and is adapted to receive and be crimped over the portion of the handle bar 14 which it contacts.

Figure 3:
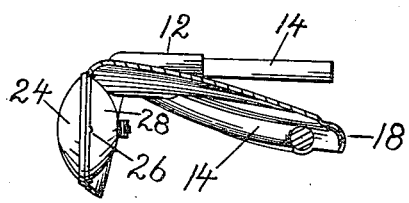
Figure 3 is a vertical sectional view taken on the line 3—3 of Figure 2.
Figure 4:
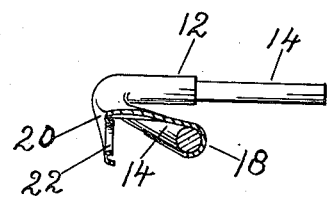
Figure 4 is a vertical sectional view taken on the line 4—4 of Figure 2.
Figure 5:
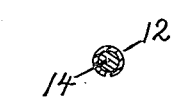
Figure 5 is a sectional view taken on the line 5—5 of Figure 1 and shows how that portion of the shield is crimped to encircle the handle bar.

The forward edge 20 of the body 10 is turned downwardly and thence inwardly. The downwardly turned portion being at substantially right angles to the top surface, as is best shown in Figures 3 and 4, is perforated 22 for the purpose of receiving electric light bulbs. A large central light 24, which serves as a head light is shown in position. This light 24 is maintained in position in the sheld by the upset portions 26, of the reflector 28. However, any other suitable means may be used for securing the lights in position.

Positioned on each side of the raised central portion 16, and in alignment with the apertures 22, is a raised portion 30 which adds to the appearance of the shield and also provides ample space in the rear of the apertures for inserting or replacing bulbs.

Where it is found desirable to further strengthen the raised portions 16 and 30, ribs 32, as shown, may be formed thereon.

It will be obvious from the above disclosure that in the preferred embodiment of this invention, as shown in the drawing, portions of the front and rear edges are crimped around the handle bar. However, where it is found desirable or advisable, the shield may be attached or connected to the handle bar by various other methods.

Where the handle bar is welded to the post a rough unsightly joint is usually produced. It is the practice of manufacturers to dress this joint on an emery wheel or to otherwise smooth it out before marketing the product. The grinding operation is slow, laborious, and costly. However, with the joint covered, as by using the shield of this invention, the costly grinding or dressing operation is eliminated.

I am aware that many changes may be made and numerous details of construction varied throughout a wide range without departing from the principles of this invention and I, therefore, do not purpose limiting the patent granted hereon otherwise than as necessitated by the prior art.

I claim as my invention:

1. A handle bar shield comprising a sheet metal member having a wide central portion, the rear edge thereof being downwardly curled, the front edge of said central portion being downwardly and inwardly turned, and a substantially cylindrical outwardly and rearwardly disposed member on opposed sides thereof.

2. A handle bar shield comprising a sheet metal member having a wide central portion, the rear edge of said member being downwardly curled and adapted to be secured to a portion of a handle bar, and portions of said shield adapted to rest on and be secured to corresponding portions of a handle bar.

3. A handle bar shield comprising a sheet metal member adapted to be positioned upon a handle bar, the forward edge of said member being turned downwardly and inwardly, and portions of said forward edge conforming to the curvature of portions of said handle bar.

4. A handle bar shield comprising a sheet metal member adapted to be positioned upon a handle bar, the rear edge of said member being turned downwardly and portions of said edge conforming in cross section to the shape of said handle bar.

5. A handle bar shield comprising a sheet metal member having downwardly turned front and rear edges, portions of said front and rear edges adapted to be crimped upon corresponding portions of said handle bar.

6. In a handle bar, a sheet metal member having a wide central portion and outwardly and rearwardly disposed end portions positioned thereon, said ends being adapted to be crimped over said handle bar, and the forward edge of said member being turned downwardly and formed to receive a lamp.

7. A handle bar shield comprising a sheet metal member having a downwardly and inwardly turned front edge, and a centrally located electric light receiving aperture in said front edge, and means for securing said shield to a handle bar.

8. A handle bar shield comprising a sheet metal member having a downwardly turned front and rear edge, and a plurality of electric light receiving apertures in said front edge and means for securing said shield to a handle bar.

9. A handle bar shield comprising a sheet metal member adapted to be positioned over the central portion of a handle bar, the rear edge of said shield corresponding substantially in plan formation to the shape of the handle bar to which it is attached, the forward edge of said shield being apertured and turned downwardly, and an electric light bulb positioned in each of said apertures.

10. In a handle bar a substantially flat member adapted to be positioned on said handle bar, the front edge of said member being formed to receive a plurality of electric light bulbs, a plurality of electric light bulbs positioned in said front edge, means for securing said member to the central portion of said handle bar, and means for securing the outer portions of said member to the handle bar adjacent the grips thereof.

11. In a handle bar, a member having a wide central portion and restricted cylindrical end portions, said central portion having an apertured downwardly turned front edge adapted to receive a plurality of electric light bulbs, means for connecting the restricted portions of said member to the handle bar, and means for connecting said handle bar and said member at intermediate points.

12. In a handle bar, a member adapted to incase the central portion of said handle bar, and means for securing said member in position, said means including portions adjacent the edges of said member adapted to be crimped upon said handle bar.

BERT J. ANDERSON.